UNITED STATES PATENT OFFICE.

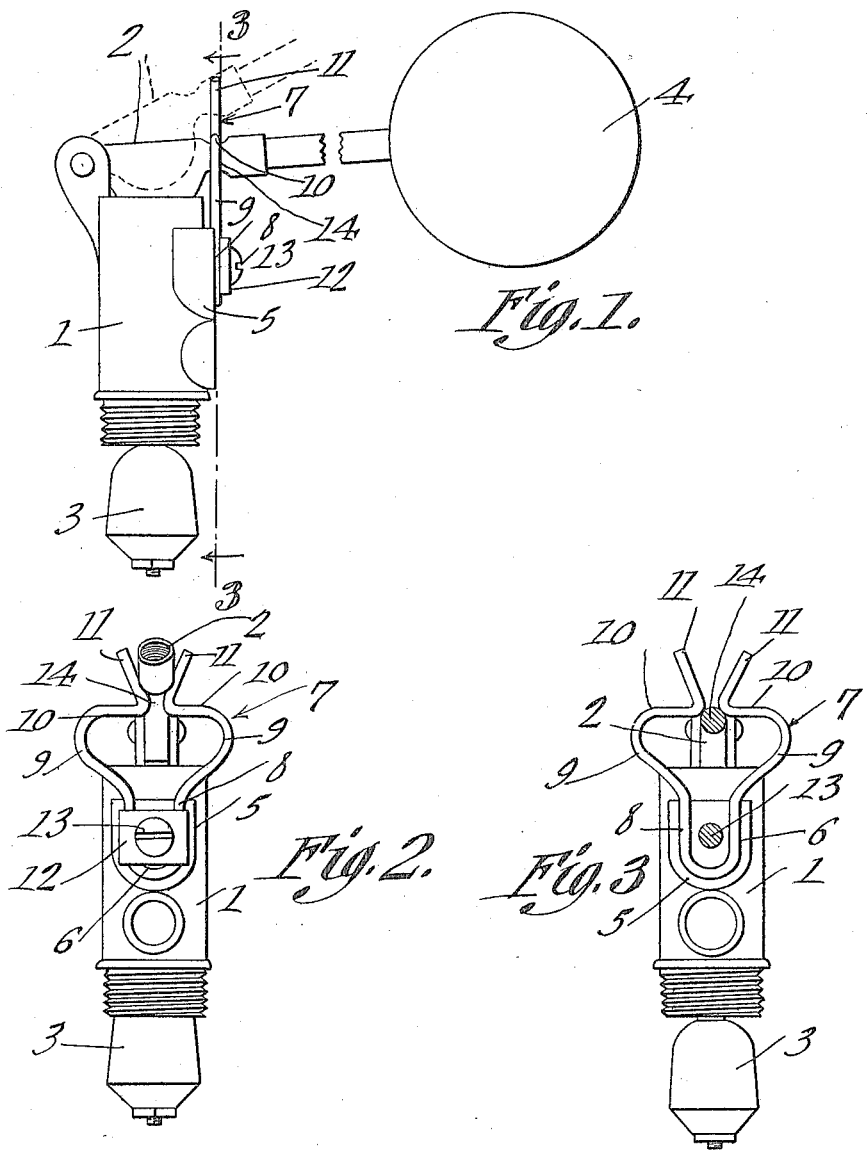

GEORGE F. VOIGT, OF CHARLESTOWN, INDIANA.

VALVE-CATCH.

1,161,554.          Specification of Letters Patent.     Patented Nov. 23, 1915.

Application filed June 4, 1915.   Serial No. 32,153.

*To all whom it may concern:*

Be it known that I, GEORGE F. VOIGT, a citizen of the United States, residing at Charlestown, in the county of Clark and State of Indiana, have invented a new and useful Valve-Catch, of which the following is a specification.

The present invention appertains to flushing tank valves, and relates more particularly to a device for controlling the movements of the float lever or stem which opens and closes the valve.

It is the object of the invention to provide a catch of novel and improved construction, adapted to be carried by the valve casing, and coöperable with the float lever or stem, whereby when the stem is lowered due to the discharge of water from the tank, the lever will be held by the catch, until the tank is again filled with water, in which event the buoyancy of the float overcomes the tension of the catch and quickly releases the float lever so that the valve is closed quickly, whereby the slow noisy filling of the tank is avoided as in ordinary flushing tanks.

It is also the object of the invention to provide a valve catch of the nature indicated, which is comparatively simple and inexpensive in construction, which may be readily applied to the valve casing and float lever to perform its function in a thoroughly effective manner, and which is simple, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a side elevation of a flushing tank valve having the catch assembled therewith, the float lever being illustrated in full lines in lowered position, and in raised position in dotted lines, a portion of the float lever being broken away. Fig. 2 is another side elevation of the valve, looking at right angles to the line of view in Fig. 1. Fig. 3 is a vertical section taken on the line 3—3 of Fig. 1.

In the drawing, there is illustrated a supply valve for a flush tank, similar to that illustrated in my co-pending application Serial No. 873,197, filed November 20, 1914, the present invention being an improvement over the valve structure disclosed in said application.

The valve structure illustrated embodies an upright tubular valve casing 1, to the upper end of which is pivoted or fulcrumed the float lever or stem 2, which controls the valve 3, whereby when the lever 2 is lowered, it will open or unseat the valve 3, and whereby when the lever 2 is raised, the valve 3 will be unseated or closed. The lever 2 has the usual float 4 at its free end.

In carrying out the invention, the casing 1 is formed at one side with a lug or boss 5 provided with a U-shaped groove 6. This lug or boss 5 supports the spring catch 7.

As illustrated, the catch 7 is formed from a single length of resilient wire, although the catch may be formed in various manners, and of various materials, and the catch 7 is bent or fashioned to have the U-shaped intermediate portion 8 seated in the groove 6. Resilient arms 9 diverge upwardly from the upper ends of the portion 8, and inturned portions 10 project toward one another from the upper or free ends of the arms 9. The terminals of the wire provide outwardly diverging fingers 11 projecting from the inner or adjacent ends of the portions, and a restricted throat is provided between the portions 10 and fingers 11. The arms 9 are resilient or flexible, in order that the portions 10 and fingers 11 can separate, and the bends between the portions 10 and fingers 11 are rounded.

The catch 7 is secured to the valve casing 1, by means of a washer or retaining plate 12 bearing against the U-shaped portion 8 of the catch, and a screw or securing element 13 engages through the washer or plate 12 and is threaded into the lug or stud 5, to clamp the portion 8 of the catch within the groove 6.

The float lever or stem 2 is provided with a reduced rounded portion 14 which is adapted to move between the fingers 11 and portions 10 of the spring catch when the float lever is raised and lowered. Normally, when the tank is full of water, the float lever 2 will be swung upwardly, due to the buoyancy of the float 4, and when the water is discharged from the tank, the weight of the lever 2 and the float 4 will cause the lever 2 to be swung downwardly, and the portion 14 of the lever will wedge between and separate the fingers 11 and portions 10 of the catch, so that the said portion 14 will be held below the portions 10 when the arms 9 spring toward one another after the portions 14 have passed the fingers 11 and portions 10. The catch thus serves to hold the lever 2 in lowered position, while the tank is being filled, and as soon as the tank is filled to about the normal water level, the buoyancy of the float 4 will overcome the tension of the spring catch 7, so that the lever 2 will be forcibly raised from between the portions 10 of the spring catch, since the portions of the spring catch separating, allow the lever 2 to swing upwardly. This will quickly close or seat the valve 3, to stop the further inlet of water into the tank. The portions 10 provide shoulders for holding the lever lowered, and the fingers 11 serve to properly direct the lever therebetween and between the portions or shoulders 10 when the lever is swung downwardly.

With the present device, the flow of water is shut off quickly as soon as the tank is filled, which avoids the noisy and slow operation of refilling the tank, as customary. Since the full flow of water into the tank is maintained when the lever 2 is held lowered, the tank will be filled quicker, and since the valve is not seated gradually but is seated quickly, the present device will avoid the objectionable noise usually incident to flushing tanks. The other advantages and attributes of the present device will be obvious, it is thought, from the foregoing, taken in connection with the drawing, without further comment being necessary.

Having thus described the invention, what is claimed as new is:—

1. The combination with a valve casing, and a float lever pivoted thereto, of a spring catch carried by the casing and having a pair of upwardly projecting resilient arms provided with shoulders projecting toward one another for holding the lever, said shoulders having the diverging portions for directing the lever between the shoulders when the lever is swung downwardly, the said arms being adapted to separate when the buoyancy of the float overcomes the tension of said arms.

2. The combination with a valve casing, and a float lever pivoted thereto, of a spring catch formed of wire and attached to one side of the casing, the said catch having resilient diverging arms provided at their free ends with portions projecting toward one another to hold said lever, said portions having diverging fingers at their adjacent ends for directing the lever between said portions, said arms being of such tension as to separate when the buoyancy of the float overcomes the tension of the catch.

3. The combination with a valve casing having a lug at one side provided with a U-shaped groove, and a float lever pivoted to the casing, of a spring catch formed from a single length of wire, the intermediate portion of the wire being U-shaped and fitting in said groove, the wire having resilient diverging arms projecting from the ends of said U-shaped portion, the arms having inturned portions at their free ends projecting toward one another to hold said lever, and said inturned portions having diverging fingers at their adjacent ends for directing the lever between said inturned portions, and means for clamping the said U-shaped portion of the wire within said groove.

In testimony that I claim the foregoing as my own, I have hereto affixed my signature in the presence of two witnesses.

GEORGE F. VOIGT.

Witnesses:
 ANNA M. BURKE,
 LORA J. BURTT.